United States Patent [19]

Burgess, Jr.

[11] 4,434,583
[45] Mar. 6, 1984

[54] AUTOMATICALLY ADJUSTABLE WORKPIECE GUIDE AND FEED MECHANISM

[76] Inventor: Warren C. Burgess, Jr., 31922 Lake Rd., Avon Lake, Ohio 44012

[21] Appl. No.: 280,904

[22] Filed: Jul. 6, 1981

[51] Int. Cl.³ .............................................. B24B 5/18
[52] U.S. Cl. ......................... 51/103 TF; 51/103 WH; 51/215 E; 51/215 CP; 51/215 R; 198/442; 198/771
[58] Field of Search ...... 51/103 R, 103 TF, 103 WH, 51/215 R, 215 HM, 215 CP, 215 H, 215 E, 215 M; 198/367, 442, 446, 453, 771

[56] References Cited

U.S. PATENT DOCUMENTS

| | | | |
|---|---|---|---|
| 1,741,236 | 12/1929 | Heim | 51/103 TF |
| 2,608,037 | 8/1952 | Lindhe | 51/103 TF X |
| 3,193,078 | 7/1965 | Amenta et al. | 198/442 X |
| 3,580,640 | 5/1971 | Eriksson | 198/442 X |
| 3,667,590 | 6/1972 | Mead | 198/771 X |
| 4,147,248 | 4/1979 | Kurczak et al. | 198/442 X |

FOREIGN PATENT DOCUMENTS 571799  3/1959  Canada ............................ 51/103 R

*Primary Examiner*—Frederick R. Schmidt
*Assistant Examiner*—Robert P. Olszewski
*Attorney, Agent, or Firm*—Fay & Sharpe

[57] ABSTRACT

An automatically adjustable mechanism for feeding or guiding workpieces along a predetermined flow path from a first position toward a second position adjacent a centerless grinder work rest. The mechanism includes a guide assembly having a pair of parallel spaced apart guide members defining an elongated flow path extending between the assembly first and second ends generally corresponding to the first and second positions, respectively. The guide assembly first end is adapted to be fixedly secured to some stationary structure and the second end is adapted for connection to the work rest. A bearing arrangement at the first end of the guide assembly facilitates selective automatic movement of the guide assembly laterally of the flow path in response to periodic lateral adjustments of the grinder work rest. Preferably, an elongated vibratory structure is disposed beneath and at least longitudinally coextensive with the guide assembly for establishing a flow path bottom wall. The feed and guide mechanism is mounted so that the guide assembly portion thereof is generally laterally movable relative to the top surface of the vibratory structure.

9 Claims, 9 Drawing Figures

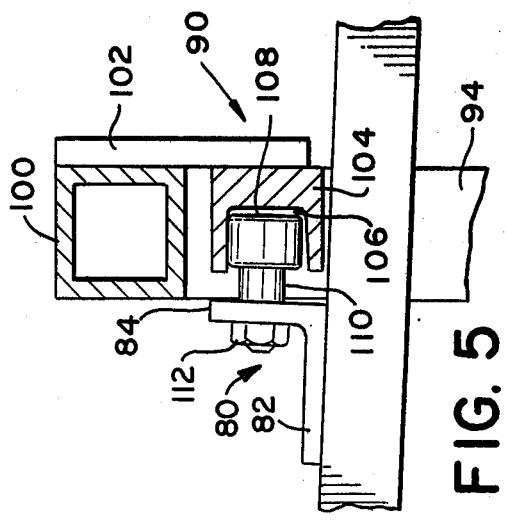
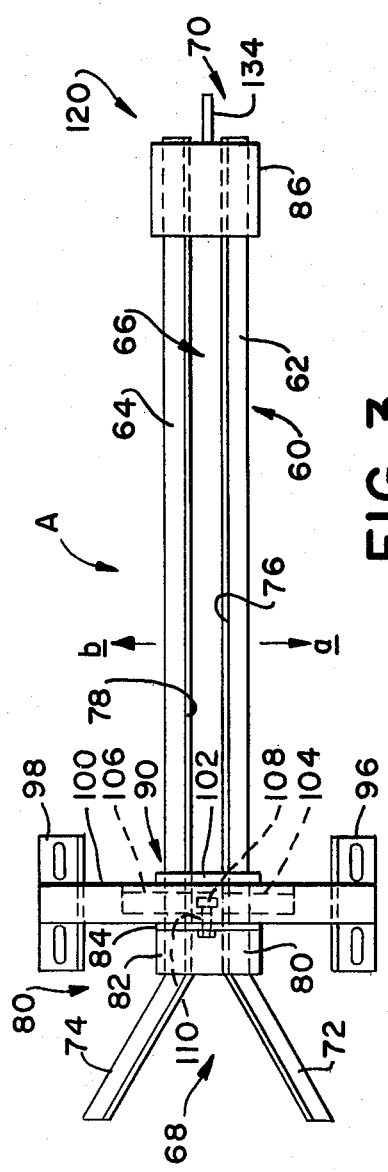
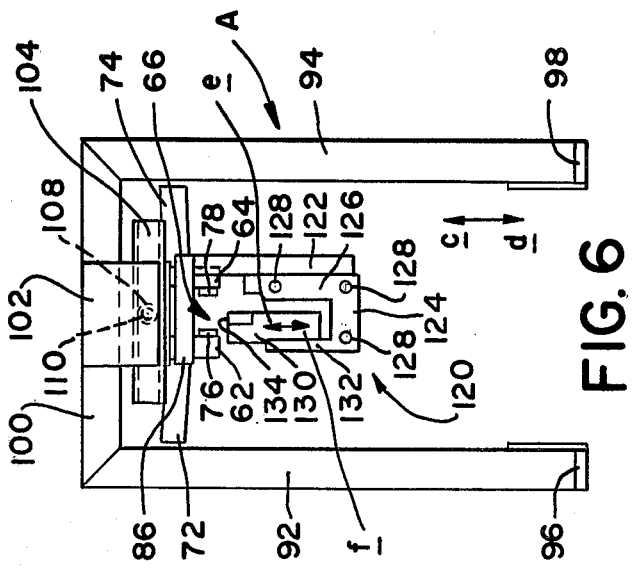
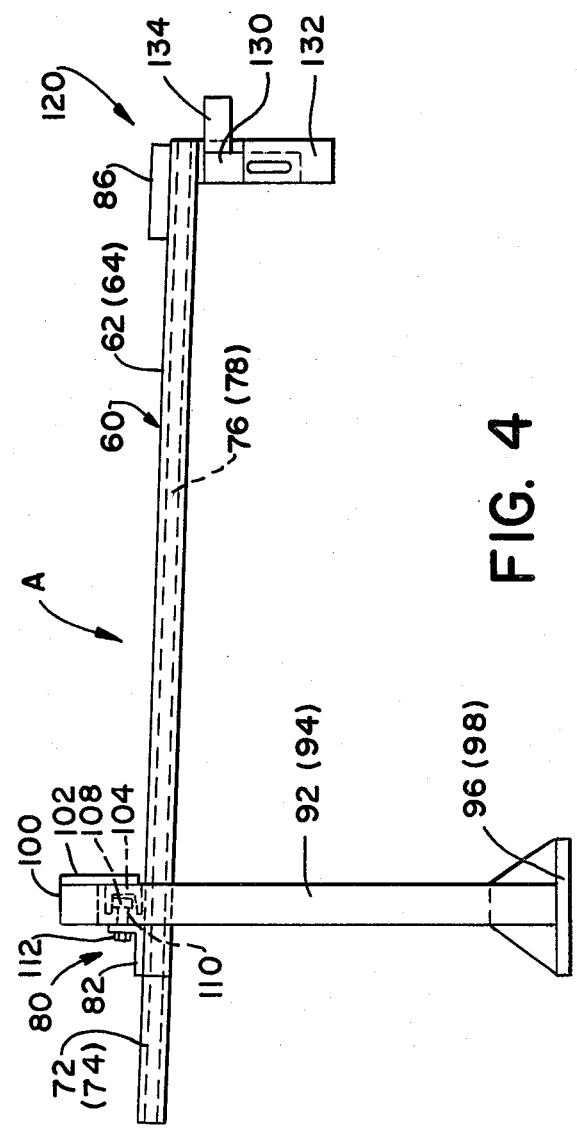

AUTOMATICALLY ADJUSTABLE WORKPIECE GUIDE AND FEED MECHANISM

BACKGROUND OF THE INVENTION

This invention pertains to the art of material handling apparatus and more particularly to workpiece guiding and feeding apparatus.

The invention is particularly applicable to consecutively feeding workpieces to a thrufeed type centerless grinder for processing therethrough. However, it will be appreciated by those skilled in the art that the invention may be readily adapted to use in other types of equipment and environments.

Centerless grinding is a method of grinding a cylindrical surface without mechanically rotating the workpiece between fixed centers. The workpiece is supported and rotates between three fundamental machine components, namely, a grinding wheel, a regulating or feed wheel and a work rest. The grinding wheel does the actual grinding while the work rest positions the work for such grinding. The regulating wheel has the three-fold function of controlling the speed of workpiece rotation, controlling sizing of the workpiece and controlling the rate of work travel through the thrufeed type grinding machine. Moreover, and in thrufeed grinding, the actual grinding is performed by passing the workpiece axially between the grinding and regulating wheels. The speed, diameter and angle of inclination of the regulating wheel determines the workpiece traverse rate.

In some centerless grinding installations, workpieces are consecutively fed to the grinder work rest from a workpiece supply or reservoir by means of conveyors, workpiece slides and the like. Such workpiece handling apparatus must thus be precisely positioned between the supply and work rest. However, in centerless grinding operations, the grinding wheel contour is slowly changed from one size to another so that the accuracy with which the parts may be ground is affected. Therefore, the grinding wheel must be dressed or trued at regular intervals. Each dressing or truing operation reduces the grinding wheel diameter. Thus, in order to retain the proper dimensional relationships between the grinding wheel, work rest and regulating wheel, it is necessary to periodically adjust the work rest and regulating wheel generally laterally toward the grinding wheel face following each truing operation. Furthermore, and as each worn grinding wheel is replaced with a new one, it is necessary to adjust the work rest and regulating wheel laterally away from the new grinding wheel to again establish proper spacial orientation therebetween.

In prior apparatus for sequentially feeding workpieces into a thrufeed type centerless grinder, it has been necessary to correspondingly adjust the feed apparatus with each adjustment of the work rest and regulating wheel. While the amount of each adjustment may only be on the order of magnitude of a few thousandths of an inch, prior devices have not provided or incorporated any means for automatically effecting the necessary feed structure adjustment. As a result, it has heretofore been necessary to physically move or adjust the feed apparatus independently of work rest and regulating wheel adjustments. Since the feed apparatus may itself be receiving workpieces from a bulk type workpiece reservoir or from another centerless grinder, the movement and readjustment required therefor was oftentimes exceedingly tedious and time consuming. In some instances, it has also been necessary to move and adjust the bulk feeders themselves. As a result, natural grinding wheel wear and periodic dressing or truing caused substantial grinder downtime because of the additional time required for repositioning and readjusting the attendant workpiece feeding equipment. Such downtime, in turn, causes a reduction in overall production output.

Further, vibratory structures or conveyors have not heretofore been effectively usable in the type of grinding operations here involved. Such vibratory structures are, by their very nature, extremely heavy and rather bulky. Thus, adjustments of such structures at regular intervals is even more difficult and time consuming. In addition, no means has previously been developed to prevent transference of vibrations from the vibratory structure to the grinder work rest. Vibrations which are so transferred cause undesirable "chatter" in the overall grinding operation.

It has, therefore, been desired to develop some means which would facilitate automatic adjustment of workpiece feeding equipment associated with centerless grinders in order that separate readjustment thereof at regular intervals may be substantially reduced and/or entirely eliminated. It has been additionally desired to provide such means which would also reduce and/or entirely eliminate the necessity for moving attendant workpiece feed or supply such as bulk workpiece reservoirs and the like each time the grinder work rest and regulating wheel were adjusted relative to the grinding wheel. It has also been desirable to provide a feed or guide mechanism which could advantageously utilize the benefits obtainable from vibratory type structures or conveyors while at the same time eliminating the undesirable aspects thereof.

The present invention contemplates new and improved apparatus which overcomes all of the above referred to problems and others and provides an adjustable feed or guide mechanism for feeding workpieces to a centerless grinder. The invention features structure which is simple in design and construction, is economical to use, is automatically adjustable responsive to adjustment of an associated work rest, accommodates the effective use of vibratory type structures or conveyors, is adapted to be used intermediate a bulk workpiece feeder and a grinder or between a pair of consecutive grinders, and is readily adapted to use in many other environments and applications.

BRIEF DESCRIPTION OF THE INVENTION

In accordance with the present invention, there is provided a workpiece guide or feed mechanism adapted to guide workpieces along some predetermined workpiece flow path from a first position toward a spaced second position. The mechanism is designed and constructed so that a guide assembly portion thereof may be laterally adjusted as a unit relative to an associated surface which defines a guide assembly bottom wall. Such permitted movement allows a work path defined by the guide assembly to be selectively adjusted laterally as deemed necessary and/or appropriate.

Further in accordance with the invention, the guide mechanism includes connecting means adjacent at least one end of the guide assembly adapted for operably interconnecting the mechanism relative to adjacent structure. In one arrangement, the connecting means comprises a pivot type of mounting for allowing the guide mechanism other end to be moved in an arcuate path or sweep between a plurality of predetermined stations. In another arrangement, the connecting means provides a generally rigid interconnection between the guide assembly and the associated structure to effect automatic lateral adjustment of the guide assembly in response to lateral movement occurring at the associated structure.

According to another aspect of the invention, the guide assembly is adapted to be positioned closely above the surface which forms the work path bottom wall and to extend generally coextensive therewith over the cooperative lengths thereof. In the preferred arrangement of the invention, this surface comprises the top surface of a vibratory type structure. Preferably, the top surface includes a plurality of closely spaced fibers to provide a desired workpiece conveying action.

In accordance with a further aspect of the present invention, a first connecting means is provided which includes at least one support leg adapted to be fixedly secured to some generally stationary structure. An elongated bridge member extends generally horizontally outward from the support leg at an area spaced toward the leg top end and includes means for cooperating with the guide assembly. In the preferred construction, this cooperating means comprises bearing means which support the guide assembly and allow selective automatic movement thereof between defined limits over at least a portion of the bridge member length. The bearing means preferably comprises a roller bearing rotatably journalled to one of the bridge member and guide assembly with an elongated bearing track which receives the bearing being secured to the other of the bearing member and guide assembly.

According to yet another aspect of the present invention, the guide assembly portion of the guide mechanism includes a workpiece inlet area. This inlet area is defined by guide member extensions extending outwardly from each guide member at the guide assembly first end in a diverging relationship to each other and generally coplanar with the plane defined by the guide members themselves. In the preferred arrangement, the maximum distance between the guide member extensions at the outermost terminal ends thereof is at least generally as great as the maximum amount of permissible guide assembly movement between defined limits.

The invention is particularly applicable to use in a centerless grinding installation where a grinder work rest is periodically adjustable laterally of a grinder grinding wheel to maintain proper spacial orientation therebetween. The guide assembly portion includes a pair of parallel spaced apart elongated guide members which define a workpiece work path therebetween and which further define guide assembly first and second ends generally corresponding to the first and second positions. The first connecting means is disposed adjacent the first end and is adapted to be fixedly secured to an associated substantially stationary structure. A second connecting means adjacent the second end is adapted to fixedly secure the second end in operative communication with the grinder work rest. Cooperating means interposed between the first connecting means and the guide assembly allows selective lateral movement of the guide assembly relative to the first connecting means. Such movement facilitates automatic lateral adjustment of the work path in response to each lateral adjustment of the grinder work rest.

In the foregoing environment, the second connecting means is adapted to fixedly secure the guide assembly directly to a centerless grinder work rest. The overall feed mechanism further includes a workpiece support blade communicating with the work path adjacent the second position. This work blade is independently adjustable in a generally vertical direction relative to the work path to provide workpiece support at some desired elevation immediately adjacent the work rest. The second connecting means itself also desirably includes means for allowing selective generally vertical adjustment thereof independently of the guide assembly.

The principal object of the present invention is the provision of a new and improved guide or feed mechanism for feeding workpieces to workpiece processing and/or handling apparatus.

Another object of the present invention is the provision of such a guide mechanism which is automatically adjustable to accommodate periodic lateral movement occurring at adjacent apparatus.

Another object of the invention is the provision of a guide mechanism which is readily adaptable to use in any number of production installations using various workpiece processing or handling techniques and equipment.

Still a further object of the invention is the provision of an adjustable guide or feed mechanism particularly suited for use with centerless grinders wherein attendant production equipment need not be adjusted or moved commensurate with automatic guide mechanism adjustment.

Still other objects and advantages for the invention will become readily apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 3 is a plan view of the guide mechanism itself;

FIG. 4 is a side elevation of the guide mechanism of FIG. 3;

FIG. 5 is an enlarged view in partial cross-section of a portion of FIG. 4 showing the roller bearing interconnection between the guide assembly and first connecting means;

FIG. 6 is a right hand end view of the guide mechanism shown in FIGS. 3 and 4;

DETAILED DESCRIPTION OF PREFERRED AND ALTERNATIVE EMBODIMENTS

Figure 1:
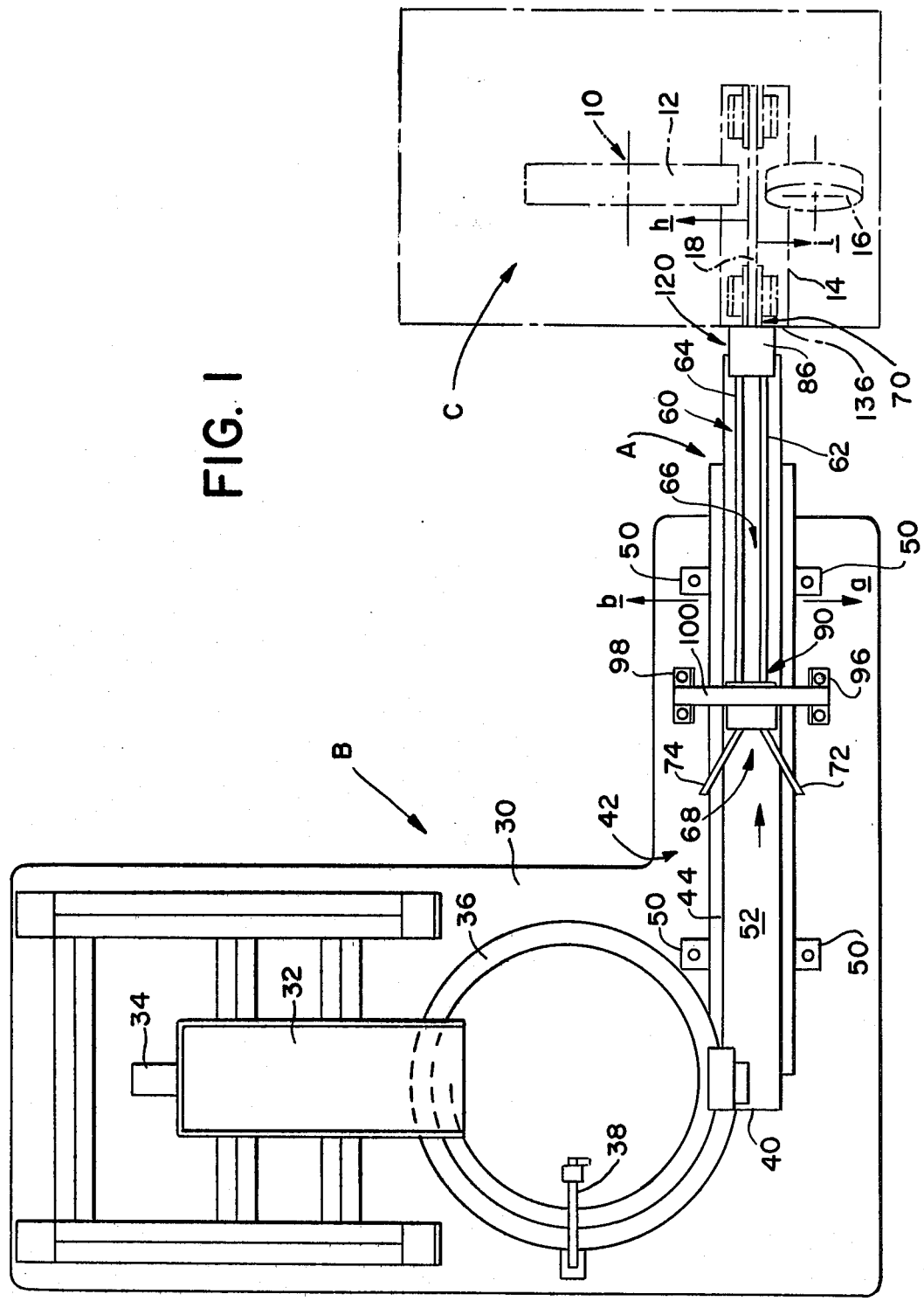
FIG. 1 is a plan view of the subject guide or feed mechanism as it is operably installed intermediate a bulk workpiece supply reservoir and a centerless grinder.
Figure 2:
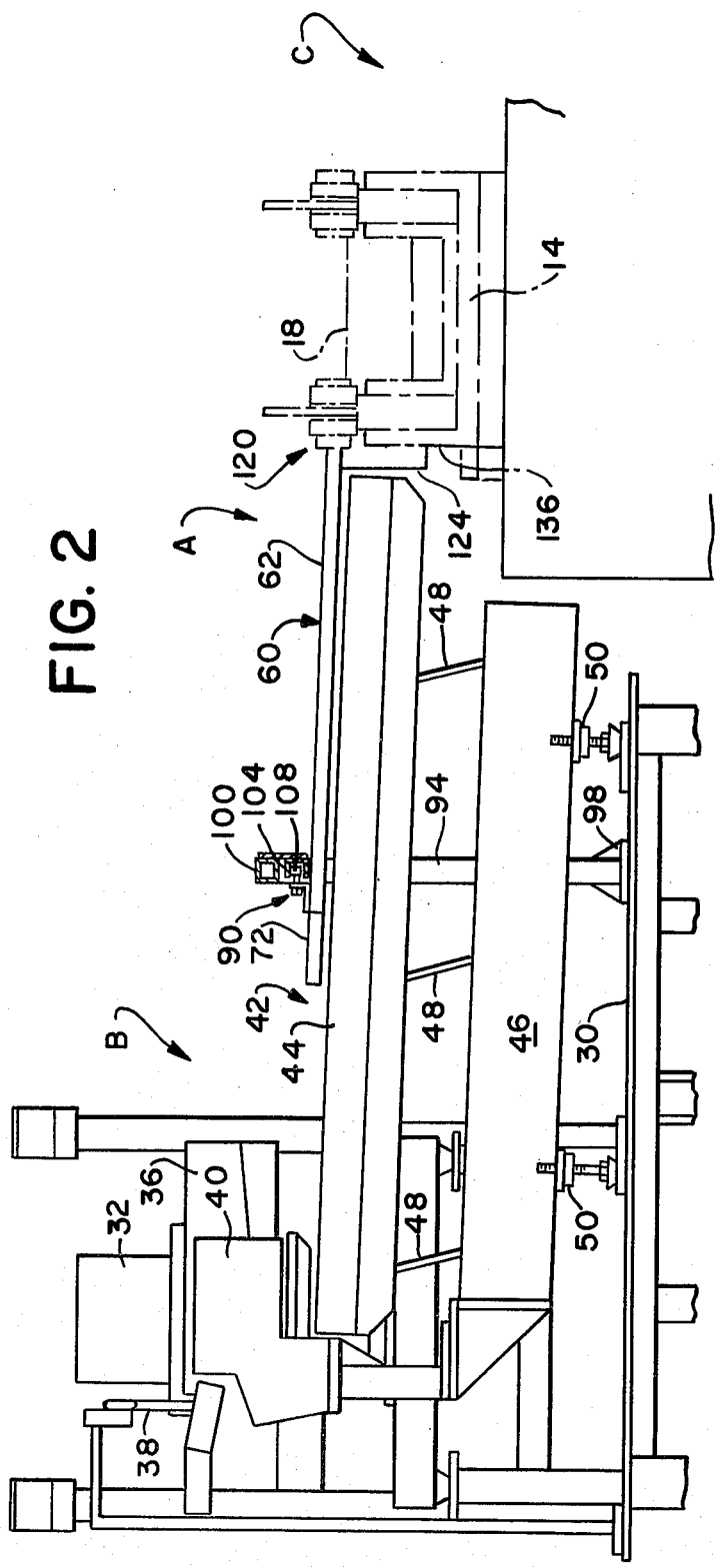
FIG. 2 is a partial side elevation of the arrangement shown in FIG. 1.

Referring to the drawings wherein the showings are for purposes of illustrating preferred and alternative embodiments of the invention only and not for purposes of limiting same, FIGS. 1 and 2 show a workpiece guide or feed mechanism A which is installed in an operative relationship with the output side of a bulk type workpiece supply assembly B and the input side of a thrufeed type centerless grinder C. In this type of production set-up, it is desired to sequentially move workpieces from supply assembly B, along mechanism A and into centerless grinder C for grinding.

More particularly, centerless grinder C includes a conventional grinding wheel 10 mounted to rotate about its center axis in order that peripheral grinding surface 12 may engage workpieces as they flow therepast to effect the desired grinding operation. The centerless grinder also includes a work rest 14 and a regulating wheel 16. In centerless grinding, the grinding wheel does the actual grinding while the work rest positions the workpiece for grinding. The regulating wheel has a three-fold function in controlling the speed of workpiece rotation, sizing of the workpiece and the rate of workpiece travel through the grinding machine. A work blade 18 extends along work rest 14 at the top or upper area thereof for actually supporting a workpiece as it passes through the grinding operation. Of course, different types and styles of work rests may be utilized to accommodate a particular production operation and accommodate a particular workpiece configuration. Such different types and styles of centerless grinders are known in the art, do not form a specific part of the present invention and are not, therefore, described in greater detail herein. The description of grinder C is merely for purposes of appreciating the present new workpiece feed or guide mechanism.

During the course of a production type grinding operation wherein a plurality of individual workpieces are processed through thrufeed centerless grinder C, changes to the contour of grinding wheel 10 at face 12 occur so that the grinding wheel slowly decreases in size. This decrease begins to affect the accuracy with which the workpieces may be ground. At regular intervals, the grinding process is stopped and a dressing operation takes place. In this dressing operation, a diamond pointed tool is precisely moved across peripheral surface 12 to the grinding wheel to bring the wheel back to the shape desired. The grinding wheel diameter is reduced with each such dressing or truing operation. As a result, work rest 14 and regulating wheel 16 must be moved laterally toward the grinding wheel by the amount of grinding wheel material removed during each dressing operation. Thus, any apparatus employed for guiding workpieces into the grinder work rest must be similarly adjusted to maintain an appropriate feeding relationship with the work rest.

In grinding workpieces of a hard material, it is not at all uncommon to require grinding wheel dressings several times during one eight hour work shift. While the amount of material removed during each dressing is quite small, i.e., on the order of magnitude of 0.004" or so, the initial diameter of a typical grinding wheel in this environment may be approximately 20" and after many dressings the final diameter just before replacement may be approximately 15". Thus, lateral adjustment of the work rest and regulating wheel may typically be on the order of magnitude of $2\frac{1}{2}$" or so over the useful life of each grinding wheel.

With continued reference to FIGS. 1 and 2, the various components of workpiece supply assembly B there shown are generally typical of many different component types and designs which could be and are advantageously used in this environment. More particularly, however, supply assembly B includes a generally L-shaped (FIG. 1) base or frame 30 which provides rigid support for the remainder of the assembly components. Base 30 may, in turn, include appropriate support legs, casters or the like (not shown). In accordance with the subject invention, it is desired that all the various components of assembly B be maintainable in a stationary position relative to centerless grinder C even when work rest 14 and regulating wheel 16 are laterally adjusted in the manner hereinabove described. Frame 30 accommodates a workpiece hopper (not shown) and includes a gate arrangement in the bottom thereof which may be selectively opened and closed to allow workpieces to fall therefrom onto the surface of a vibratory bulk feeder pan 32. A reciprocating type air motor 34 drives the bulk feeder pan along a conveying path determined by a spring support system.

Bulk feeder 32 moves the workpieces from the hopper to a vibratory bowl feeder 36 upon a signal from a bowl level control 38. As shown, level control 38 merely comprises a limit switch having an arm which essentially floats on top of the workpieces vibrating around the bowl feeder. When the level of workpieces in the feeder drops below a predetermined minimum, level control 38 activates reciprocating air motor 34 so that additional workpieces will be delivered to bowl feeder 36. Also as shown, a workpiece orienting device 40 is disposed adjacent vibratory bowl feeder 36 for purposes of orienting each workpiece in a desired position for processing through centerless grinder C.

From orienting device 40, the workpieces enter a straight line vibratory conveyor or transfer feeder generally designated 42. Heretofore, however, vibratory structures have generally not been successfully used in the feeding of workpieces to a centerless grinder. The conveyor or transfer feeder as shown in FIG. 2 includes a conveyor portion 44, a balance weight 46 and a plurality of reinforced plastic springs 48 which support conveyor portion 44 on the balance weight 46. The balance weight is mounted to the base or frame 30 by convenient means such as a plurality of adjustable mounting leg assemblies 50 or the like.

Referring particularly to FIG. 1, surface 52 of conveyor portion 44 is advantageously lined with a carpet-like construction comprised of nylon fibers which are inclined outwardly from surface 52 so as to extend forwardly toward the area of grinder C. This arrangement facilitates obtaining a desired feeding action for any workpiece placed on the surface. Use of a nylon fiber carpet provides a quiet, positive workpiece feeding action with a minimum chance of causing damage to fine surfaces of workpieces being conveyed therealong. Also, it reduces the chances of transmitting vibrations through those workpieces being conveyed to a workpiece being processed or ground in the centerless grinder. Such vibrations could cause chatter marks to appear in the ground workpieces.

Vibratory conveyors or structures such as the one designated 42 in FIGS. 1 and 2 and which are driven by free piston air motors are known as being extremely low maintenance and hazard free tools for use in work environments where a great deal of liquid spray and other contaminating vapors exist. The area immediately adjacent the grinding wheel 10 is filled with heavy and fine mist, abrasive particles down to sub-microscopic size and other contaminants. The vibratory conveyor is thus believed to be a particularly good system for conveying workpieces into centerless grinders except for the fact that a reasonably heavy and costly mounting and adjustment system has previously been required to permit periodic vibratory conveyor adjustment in response to the necessary selective lateral movement of work rest 14 and regulating wheel 16. Because of the foregoing problems, chain conveyors have been commonly employed for transporting workpieces into centerless grinder work rests. However, since the environment adjacent a centerless grinder will adversely affect various ones of the chain conveyor components, this type of conveyor requires a greater frequency of maintenance attention. This, in turn, causes undesired disruptions in production capabilities. Furthermore, it is necessary to loosen the pivoting ends of chain conveyors prior to adjustment of the work rest and then retighten them following such adjustment, causing further loss in production.

In addition, and with regard to straight line vibratory conveyor or transfer feeder 42 described above, the usual type of vibratory conveying surfaces comprised of urethane, stainless steel, hard steel and the like are not particularly satisfactory in many applications. The lubricity settling on the conveyor surface from coolants and the like utilized during grinding operations, causes difficulty in driving workpieces across the stationary components of the grinder work rest. Such problems render these conveying surfaces questionable insofar as reliability is concerned.

Use of the above described inclined fibers for conveyor surface 52 eliminates the foregoing problems and others. Further, since workpiece guide or feed mechanism A which will be described in detail hereinafter is in no way attached to vibratory conveyor or transfer feeder 42, the mechanism advantageously accommodates use of vibratory structures by eliminating the problem of constantly having to effect readjustment thereof commensurate with work rest adjustment.

Another advantage realized in providing a guide or feed mechanism which accommodates a vibratory conveyor or transfer feeder of the type described above resides in the fact that this type of feeder lends itself to use of materials which will perform well over extended periods of time with very limited maintenance. For example, the conveying action by the inclined fibers which comprise surface 52 is achieved by workpiece impingement thereon to cause a fiber bending action. As the fibers then straighten during the next portion of the vibratory cycle, and since the fibers are inclined, a conveying action is achieved for moving each workpiece forward. The fibers are selected to permit such flexing with virtually no affects from fatigue or abrasion. Fatigue and abrasion problems are typically present in those types of vibratory feeders which utilize conventional fixed surfaces such as those described above.

To facilitate the above described operation and results, the subject new workpiece guide or feed mechanism A is advantageously provided. With particular reference to FIGS. 3, 4, 5 and 6, this mechanism is comprised of a guide assembly generally designated 60 having a pair of elongated guide members 62,64 disposed in a parallel spaced apart relationship to each other to define an elongated work path or workpiece flow path 66 therebetween and having a first end 68 and a second end 70. When mechanism A is installed, the first end is disposed remote from the centerless grinder toward workpiece supply assembly B and second end 70 is disposed in close cooperative communication with grinder C.

Guide members 62,64 each include guide member extensions 72,74 at first end 68 with these guide member extensions acting to define a work path inlet area. The guide member extensions are generally coplanar with the plane defined by the guide members 62,64 and diverge outwardly of each other. The distance between the outermost terminal ends of extensions 72,74 is desirably at least slightly greater than the width of surface 52 (FIG. 1) of the vibratory conveyor or transfer feeder 42 with which the guide or feed mechanism is to be associated. The reasons for this dimensional relationship will become more readily apparent hereinafter.

The guide members and guide member extensions may be advantageously constructed from any appropriate material with conventional steel tubing, bars or the like being preferred. In addition, a pair of guide surfaces 76,78 may be fixedly secured to the guide members and guide member extensions so as to provide workpiece guiding surfaces. These guide surfaces are desirably constructed from a material such as hardened tool steel or the like which will present a low friction, high wearing surface.

An angled retainer plate generally designated 80 and having legs 82,84 is utilized adjacent first end 68 to retain guide members 62,64 in a predetermined spaced relationship with each other. Another retaining plate generally designated 86 is utilized adjacent second end 70 for similarly retaining the guide members in a desired spaced apart relationship. As shown, guide members 62,64 are secured to retainer plate leg 82 and to retainer plate 86 in a fixed relationship to each other. However, it will be appreciated by those skilled in the art that convenient means could also be advantageously included to facilitate lateral guide member adjustment to selectively accommodate varying the width of work path 66.

With continued reference to FIGS. 3-6, guide or feed mechanism A also includes a first mounting assembly generally designated 90 adjacent first end 68. This mounting assembly includes a pair of parallel spaced apart support legs 92,94 in a generally vertical disposition having feet 96,98, respectively. These feet accommodate mounting of assembly 90 to associated structure by convenient means as will become apparent. A bridge generally designated 100 extends between the uppermost ends of support legs 92,94. The support legs and bridge are all preferably constructed from thin walled steel tubing.

A track retaining plate 102 is fixedly secured to bridge 100 so as to depend downwardly therefrom generally intermediate support legs 92,94. This track retaining plate, in turn, includes an elongated track 104 fixedly secured thereto in a manner so as to extend generally horizontally beneath bridge 100. As will best be seen from FIGS. 3 and 5, this track includes a generally U-shaped track area 106 opening toward first end 68. The track may be conveniently constructed from a conventional channel member. A roller bearing 108 has an elongated axle or bearing shaft 110 extending axially outward thereof which is secured to retainer plate leg 84 by a nut 112 or some other convenient means. The relative dimensioning between roller bearing 108 and the side walls of track area 106 is such that the bearing is free to rotatably move longitudinally along the track.

With particular reference to FIG. 3, and due to the relationship of the components, movement of bearing 108 in track 104 allows shifting of guide assembly 60 laterally of work path 66 defined thereby. The directions of such movement are designated by arrows a-b in the figure. The positioning of the components themselves and the length of track 104 are such that bearing 108 will still be within track area 106 at the maximum extents of lateral movement of the guide assembly. In the structural embodiment shown, maximum lateral movement in direction a occurs when guide member 62 engages support leg 92 and maximum lateral movement in direction b occurs when guide member 64 engages support leg 94. If desired, positive stops could be included in track area 106 to limit such movement to some lesser extent. Still further, the outermost terminal ends of the legs which define U-shaped track area 106 may include retaining flanges or the like for preventing undesired axial parting or separation of the bearing from the track.

Continuing with reference to FIGS. 3-6, guide or feed mechanism A also includes a second mounting assembly generally designated 120 adjacent guide assembly second end 70. FIG. 6 particularly shows this assembly as including an elongated mounting bar 122 fixedly secured to retainer plate 86 so as to depend downwardly therefrom. A generally U-shaped clamp plate 124, in turn, has leg 126 thereof secured to the mounting bar. This mounting may be by means of mechanical fasteners received through bar 122 into the side of leg 126 and advantageously includes the capability of accommodating selective vertical adjustment of the clamp plate relative to the mounting bar. The directions of this adjustment are shown by arrows c-d in FIG. 6 and facilitates adjustment of guide mechanism A in order that it may be adapted to use in various alternative or different grinding applications. Clamp plate 124 also includes a plurality of mounting openings 128 (FIG. 6) extending therethrough which openings are utilized to fixedly secure second mounting assembly 120 directly to a grinder work rest.

A workpiece support blade 130 is secured to the other leg 132 of clamp plate 124. Convenient means are employed for this mounting in order that the work support blade may be independently adjusted vertically in directions e-f (FIG. 6) relative to work path 66. The mounting means itself may advantageously comprise threaded fasteners passing through an elongated slot in leg 132 into the side wall of support blade 130 or any other convenient means as may be necessary and/or appropriate. The support blade includes an elongated support edge member 134 extending outwardly therefrom for cooperation with the grinder work rest as will become apparent.

Referring again to FIGS. 1 and 2, description will hereinafter be made with reference to operation of workpiece feed mechanism A. As shown in these two figures, support legs 92,94 of first mounting assembly 90 straddle straight line vibratory conveyor or transfer feeder 42. Feet 96,98 of these support legs are fixedly secured by conventional threaded fasteners to the top surface of frame 30. Guide assembly 60 extends longitudinally of vibratory conveyor or transfer feeder 42 with clamp plate 124 of second mounting assembly 120 being fixedly secured as by threaded fasteners or the like to end face 136 of grinder work rest 14. As will be seen in FIG. 2, the positioning of guide assembly 60 is such that guide members 62,64 are spaced slightly above and parallel to surface 52 of conveyor portion 44. Thus, surface 52 defines a bottom wall area for guide assembly work path 66.

The transmission of vibration from the vibratory apparatus to frame 30 is prevented by convenient means. In this general environment, such means typically comprise supporting the vibratory mechanism on resilient pads located between the vibratory balance weights or the balance weights of the vibratory mechanism and the frame of the workpiece supply assembly.

Since first mounting assembly 90 is fixedly secured to rigid frame 30 of workpiece supply assembly B, vibrations from the various vibrating components in the supply assembly will not be transmitted to feed mechanism A. As previously noted, it is important that such vibrations not be transferred to the guide or feed mechanism since it could cause the vibrations to then be transferred to work rest 14 and result in workpiece chatter marks. As properly oriented workpieces travel along the fibers or carpet-like area of conveyor portion surface 52, they enter flow path 66 at the inlet area adjacent first end 68 and then travel therethrough toward second end 70. At this second end, the workpieces flow onto work support edge member 134 and then onto work blade 18 of work rest 14 for processing through centerless grinder C.

The selective independent vertical adjustments provided for clamp plate 124 and work support blade 130 at second mounting 120 easily accommodate any adjustments necessary to these components to assure proper workpiece feeding into the grinder. The width of work path 66 defined between guide members 62,64 is such that workpieces may flow in guided movement therealong. As previously noted, it is possible to provide an adjustability for the guide members in order to vary the work path width and thereby to accommodate different types, styles and sizes of workpieces. The work path inlet area defined by guide member extension 72,74 acts as a funnel to assure entry of the workpieces into the work path at first end 68. It will be appreciated that properly oriented workpieces are continuously fed in an end to end relationship along conveyor portion surface 52 and through work path 66 for successive processing through centerless grinder C. As the individual workpieces exit the grinder, they may be stacked or moved to subsequent work stations for additional processing and/or machining. Various devices for these purposes are known in the art, do not comprise a part of the present invention and are not shown in FIGS. 1 and 2.

Periodic dressing of grinding wheel 10 at peripheral surface 12 acts to decrease the wheel diameter. For that reason, it is necessary to adjust work rest 14 and regulating wheel 16 at least at corresponding periodic intervals laterally toward the grinding wheel to maintain the necessary spacial relationships between the grinding wheel, the work rest and the regulating wheel. The direction of such movement is designated by arrow h in FIG. 1. Because second mounting assembly 120 is fixedly secured directly to the work rest face 136 and because of the movable relationship facilitated between guide assembly 60 and first mounting assembly 90 at track 104 and roller bearing 108, the guide assembly will be automatically moved laterally with the work rest in direction b. Thus, work path 66 is itself automatically shifted laterally commensurate with any shifting or adjustment of work rest 14.

The work path inlet area defined by diverging guide member extensions 72,74 at guide assembly first end 68 continues to act as a funnel for guiding the workpieces into the shifted work path. The foregoing automatic adjustment of the guide assembly occurs simultaneous with each adjustment of the work rest. As a result of this feature, production down time necessitated by grinding wheel dressing can be minimized and represents a substantial reduction in down time encountered when using previously known workpiece feed or guide devices. By way of example only, the diameter of a grinding wheel may be reduced by approximately 5" due to periodic dressing from the time it is newly installed until the time it is replaced. Thus, the amount of lateral movement of guide assembly 60 may only be on the order of magnitude of $2\frac{1}{2}$" to 3". However, and while this may appear to be a rather insignificant amount, precise readjustment of the guide assembly would otherwise be required to accommodate each individual work rest adjustment. As grinding wheel 10 becomes worn and is replaced with a new one, guide assembly 60 is automatically moved in direction a commensurate with lateral adjustment of work rest 14 in direction i (FIG. 1) until the original work rest position has been reassumed.

While specific design criteria may vary somewhat between particular installations, the width of conveyor portion surface 52 must be at least slightly greater than the maximum amount of lateral adjustment to which the guide assembly will be subjected. This assures that surface 52 will provide a continuous bottom wall for the work path. Since guide assembly 60 is spaced slightly above conveyor portion surface 52, lateral movement of guide assembly 60 at frequent intervals will not scrape or otherwise interfere with the conveyor body or conveyor surface. Thus, the subject invention accommodates and provides for a fixed or permanent installation of workpiece supply assembly C and particularly, straight line vibratory conveyor or transfer feeder 42. As was discussed in detail hereinabove, use of such vibratory structures has heretofore been limited in this environment due to problems encountered with adjusting them commensurate with the periodic adjustments made to the grinder work rest. Moreover, and since support legs 92,94 of first mounting assembly 90 are fixedly secured to rigid frame 30, vibrations generated in vibrating conveyor or transfer feeder 42 are not transmitted to guide assembly 60 and/or the work rest 14.

While the above description has been made with reference to a preferred embodiment, it will become readily apparent to those skilled in the art that modifications to workpiece guide or feed mechanism A may be made without in any way departing from the overall intent or scope of the invention. For example, it may in some cases be desirable to configure support legs 92,94 in a somewhat different manner to accommodate mounting thereof to some other rigid structure. In addition, the overall concepts of the feed mechanism may be slightly modified for application to other types of processing environments. Still further, the invention is deemed readily applicable to use in cooperation with conveyors or feeders other than those of the vibratory type. An important feature of the invention resides in the automatic adjustment of the guide assembly commensurate with periodic lateral adjustment of an associated work rest or, in the case of alternative environments, periodic lateral adjustment of various structures employed for supporting and guiding workpieces.

Figure 7:
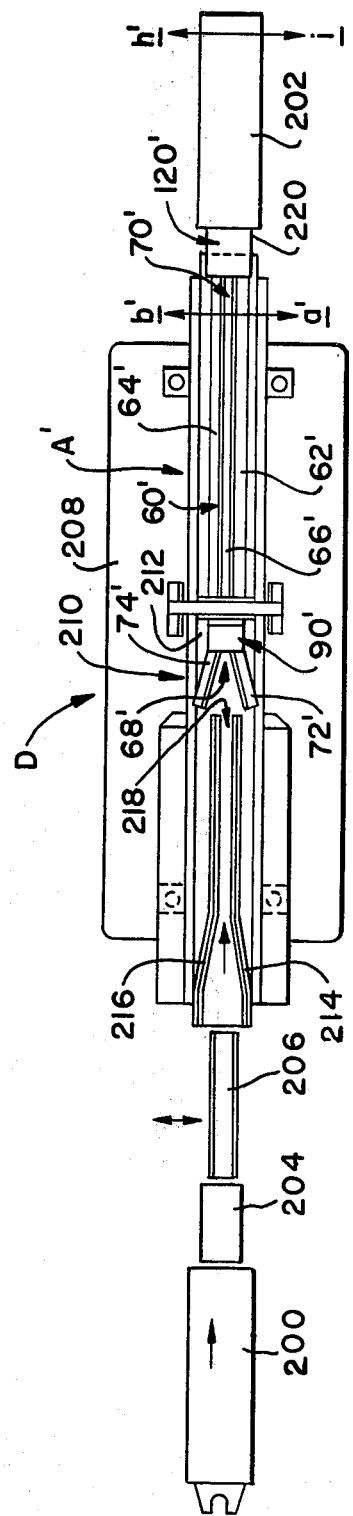
FIG. 7 is a plan view showing installation of the subject guide and feed mechanism between the output side of one centerless grinder and the input side of an adjacent centerless grinder.

By way of one example of an alternative application for the subject workpiece guide or feed mechanism, reference will hereinafter be made to FIG. 7. For ease of illustration in appreciating this alternative, like components are identified by like numerals with a primed (') suffix and new components are identified by new numerals. In this embodiment, the guide mechanism is interposed between two adjacent centerless grinders for use in moving workpieces from the output side of one grinder to the input side of the other grinder.

More particularly, a workpiece handling apparatus generally designated D overall is disposed between work rest 200 of one grinder and work rest 202 of the adjacent grinder. Appropriate gauging or the like 204 is disposed immediately adjacent the output side of work rest 200 for purposes of gauging workpieces moving therepast. Next in line is a roller type chute 206 utilized to transport the workpieces over the rear side of the frame of that grinder with which work rest 200 is associated. Workpieces flowing therealong enter the workpiece handling apparatus D.

Generally, the workpiece handling apparatus includes a stationary and rigid base or frame 208 having a straight line vibratory conveyor or transfer feeder 210 extending longitudinally thereof. This conveyor includes a carpet-like surface 212 comprised of fibers closely similar to that previously described. A pair of spaced apart fixed guides 214,216 extend along a first portion of the vibratory conveyor length to channel or guide workpieces therealong. These guides have an outlet end 218 immediately adjacent workpiece guide or feed mechanism A'. As shown in FIG. 7, first mounting assembly 90' of the feed mechanism is fixedly secured to the top surface of stationary base 208 and second mounting assembly 120' is fixedly secured to end face 220 of work rest 202.

Workpieces travelling along vibratory conveyor 210 pass through fixed guides 214,216 and exit from outlet end 218 thereof into first end 68' of guide assembly 60'. Thereafter, the workpieces travel longitudinally of work path 66' toward second end 70' and into work rest 202 for grinding. As previously described, lateral adjustment of work rest 202 at periodic intervals in directions h'-i' will cause automatic corresponding adjustment of guide assembly 60' so that work path 66' is moved laterally of its original position. This adjustment is made possible by the roller bearing and track interconnection between first mounting assembly 90' and guide assembly 60' as also described above.

Figure 9:
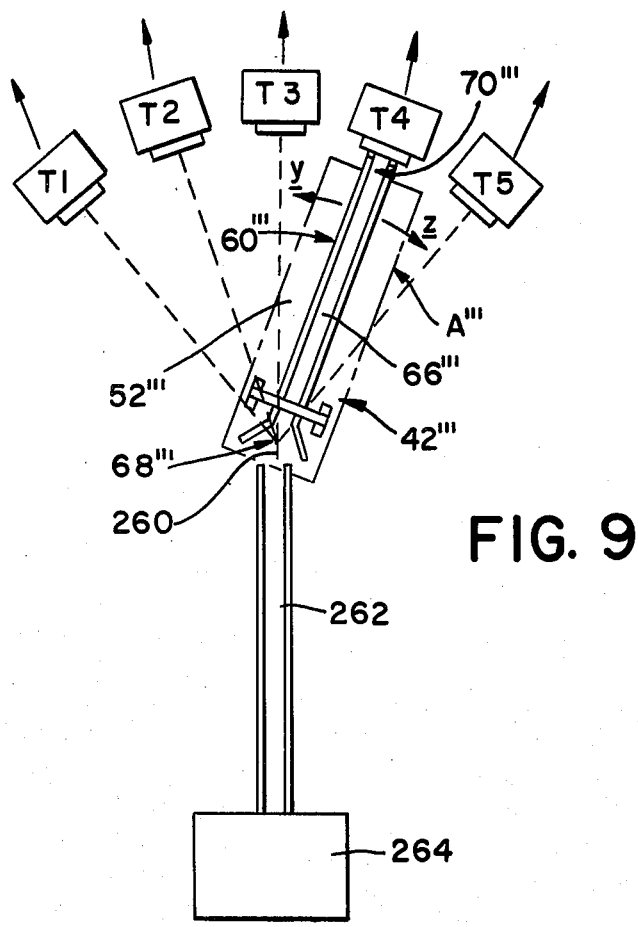
Figure 8:
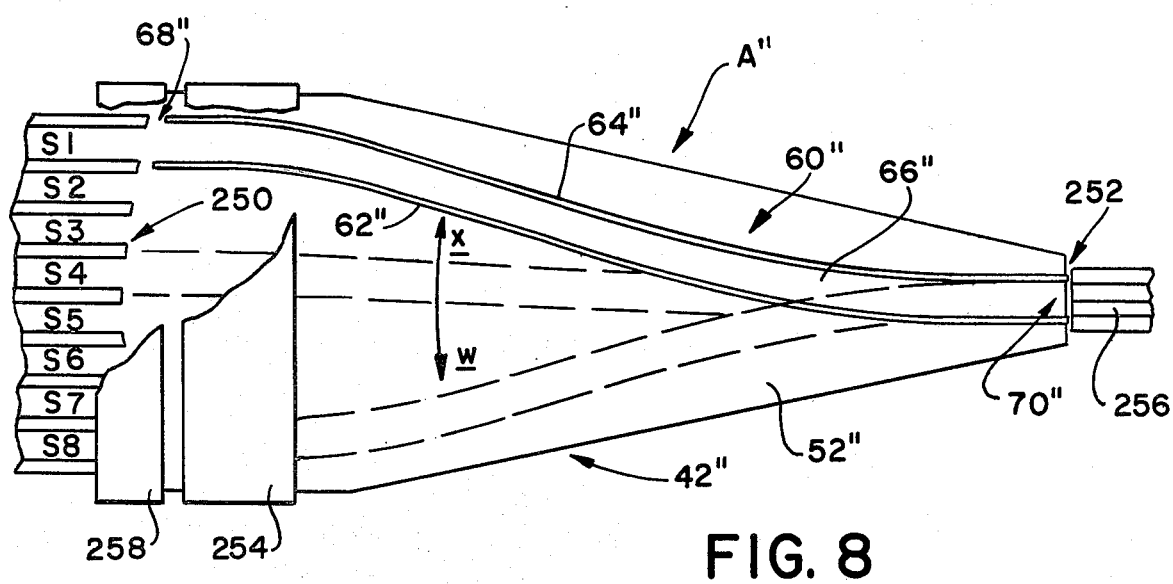
FIG. 8 is a generally schematic plan view with portions broken away for ease of illustration of another structural embodiment which incorporates the concept of the subject new guide mechanism; and, FIG. 9 is a generally schematic plan view of a still further application for the subject new guide mechanism.

Additional examples of alternative constructions and/or applications for the subject workpiece guide or feed mechanism are shown in the schematic plan views of FIGS. 8 and 9. With regard to FIG. 8, like components are identified by like numerals with a double primed (") suffix and new components are identified by new numerals. As to FIG. 9, like components are identified by like numerals with a triple primed ('") suffix with new components being identified by new numerals.

In FIG. 8, workpiece guide or feed assembly A" is somewhat schematically shown as servicing a plurality of stations S1,S2,S3,S4,S5,S6,S7,S8. These stations, in turn, may comprise actual work stations as, for example, grinders, lathes or other processing machines, or they may simply comprise additional guide mechanisms, conveyors or the like which lead to separate work stations.

In this modification, vibratory feeder or conveyor 42″ has a somewhat fan-shaped conveying surface 52″ having a receiving end 250 adjacent stations S1–S8 and an opposite delivery end 252. Guide assembly 60″ includes spaced guide members 62″,64″ which are flexible in nature so as to automatically adjust or compensate for selective sweeping movement of first end 68″ in workpiece receiving communication between stations S1–S8. These guide members may advantageously be constructed from spring steel or the like in order to accommodate the necessary and desired flexure therein. Thus, as guide assembly 60″ selectively sweeps from the solid line position shown in FIG. 8 in direction w to the other positions shown, for example, in phantom and then sweeps in direction x back to the solid position, flexible guide members 62″,64″ automatically adjust in a compatible manner to continually define a smooth work path 66″ therebetween.

A guide control generally designated 254 cooperates with guide assembly 60″ in much the same fashion as mounting assembly 90 described above to allow shifting of guide assembly 60″ in directions w-x between stations S1–S8. This guide control may also include suitable drive means for effecting the sweep of the guide assembly in directions w-x. A staging control 258 is disposed adjacent the forward end of stations S1–S8 to appropriately stage, monitor and effect operation of the line. The specific details of these features do not comprise a specific part of the present invention and are not, therefore, described in detail herein.

Although the modification of FIG. 8 contemplates transporting workpieces from stations S1–S8 toward receiving means or area 256, it will be appreciated that conveying surface 52″ could be designed so that workpieces would be transported in the opposite direction. That is, by having the inclined fibers which comprise surface 52″ properly positioned, workpieces may be transported from area 256 for selective delivery to stations S1–S8. Because such operation is substantially identical to that described above with reference to FIG. 8, further description thereof is not provided.

In FIG. 9, workpiece guide or feed assembly A‴, including vibratory feeder 42‴ and guide assembly 60‴, is shown as being movable in an arcuate sweep about a pivot connection or mounting generally located at the area designated by numeral 260 adjacent first end 68‴ of the guide assembly. With this arrangement, second end 70‴ may be moved in directions y-z for selective communication between a plurality of stations T1,T2,T3,T4,T5. Here too, these stations may comprise actual work stations or they may simply comprise additional guide mechanisms, conveyors and the like which each lead to separate work stations. Workpieces are conveyed along convenient conveying means 262 from a workpiece source 264 toward mechanism A‴. As previously described, the workpieces then enter workpiece flow path 66‴ from first end 68‴ for sequential movement toward second end 70‴.

Convenient drive means (not shown) is employed for purposes of moving workpiece guide mechanism A‴ in its arcuate sweep between stations T1,T2,T3,T4,T5 in accordance with the particular feed requirements therefor. Also, appropriate controls, sensors and the like (not shown) are included to appropriately effect and/or monitor operation of the line. These latter features do not comprise a specific part of the present invention and are not, therefore, described in detail herein.

Further, guide assembly A‴ of FIG. 9 can be reversed so as to accommodate workpiece transport in the opposite direction, i.e., from stations T1,T2,T3,T4,T5 to conveying means 262. The results would be similar to those obtained from the FIG. 8 embodiment and feed assembly A‴ would be pivotally mounted adjacent guide assembly end 70‴. This then would allow end 68‴ to selectively sweep past stations T1,T2,T3,T4,T5.

The alternative arrangements for the subject new workpiece guide mechanism described above with reference to FIGS. 7, 8 and 9 show the substantial versatility and adaptability which are attributable to the invention. Of course, further alternative arrangements and/or combinations using the new guide or feed mechanism are equally possible in still other applications and environments.

The invention has been described with reference to preferred and alternative embodiments. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. An adjustable feed mechanism for feeding workpieces to a centerless grinder wherein said grinder includes a work rest generally intermediate the circumferential grinding surface of a grinding wheel and a regulating wheel and wherein at least said work rest and regulating wheel are selectively adjustable toward and away from said grinding surface to accommodate variations in the grinding wheel dimensions, said feed mechanism comprising:

means defining a workpiece flow path for grinding said workpieces in a desired orientation therein from a first end toward a second end spaced therefrom, said first end being cooperably associated with a workpiece supply area and said second end operably communicating with said work rest for feeding workpieces thereto;

first mounting means adjacent said first end for supporting said first end while allowing selective movement of said workpiece flow path defining means generally laterally of the flow path defined thereby;

second mounting means adjacent said second end for fixedly securing said second end for movement with said work rest, whereby said flow path is automatically moved generally laterally in response to generally lateral movement of at least said work rest toward and away from said grinding wheel grinding surface; and, wherein said flow path defining means comprises a pair of elongated spaced apart guide members defining said flow path therebetween and further includes movable conveyor means therebeneath for defining an elongated flow path bottom at least between said first and second ends, said conveyor means being generally stationarily mounted relative to said workpiece supply area in spaced and unconnected relationship to said guide members and said work rest with said guide members being movable generally laterally of said flow path bottom in response to generally lateral movement of said work rest.

2. The feed mechanism as defined in claim 1 wherein said flow path bottom is continuously vibrated to effect positive movement of said workpieces along at least said flow path from said first toward said second end.

3. The feed mechanism as defined in claim 1 wherein said work path defining means includes a workpiece inlet area adjacent said first end, said inlet area being defined by a guide member extension associated with each guide member to extend outwardly of said first end in a diverging relationship with each other generally coplanar with the plane defined by said guide members, said inlet area adapted to guide a flow of workpieces into said flow path for sequential feeding into said centerless grinder at said second end, the distance between said extensions at the outermost terminal ends thereof being at least as great as the amount of movement obtainable for said work path defining means relative to said first mounting means.

4. The feed mechanism as defined in claim 1 wherein said first mounting means includes a mounting leg adapted to be fixedly secured to a stationary support with a bridge member extending outwardly therefrom above and generally transversely of said flow path defining means, said feed mechanism further including bearing means operably interposed between said bridge member and flow path defining means for vertically supporting said flow path defining means while accommodating automatic movement of said flow path defining means longitudinally of said bridge member in response to said generally lateral movement of said work rest.

5. The feed mechanism as defined in claim 1 wherein said second mounting means comprises means for fixedly securing said flow path defining means directly to said work rest at said second end, said mechanism further including a workpiece support blade adjacent said second end having first adjustment means for allowing selective adjustment thereof in a generally vertical direction relative to said flow path to accommodate desired workpiece elevation immediately adjacent said work rest.

6. The feed mechanism as defined in claim 5 wherein said securing means includes second adjustment means for allowing selective adjustment thereof in a generally vertical direction independent of said flow path defining means.

7. In a centerless grinder including grinding and regulating wheels having a work rest therebetween, said work rest and regulating wheel being selectively adjustable toward and away from said grinding wheel, elongated guide means for guiding workpieces onto said work rest and between said grinding and regulating wheels, one end portion of said guide means being connected to said work rest for movement therewith toward and away from said grinding wheel, movable conveyor means beneath said guide means for feeding workpieces therealong toward said work rest, and said conveyor means being supported in spaced unconnected relationship to said guide means and said work rest so that movements of said conveyor means are not imparted to said guide means and to said work rest and so that said guide means is adjustably movable with said work rest independently of said conveyor means.

8. The grinder as defined in claim 7 wherein the opposite end portion of said guide means is vertically supported independently of said conveyor means while being automatically movable transversely of the length of said guide means in response to movement of said first end portion with said work rest toward or away from said grinding wheel.

9. The grinder as defined in claim 7 wherein said one end portion of said guide means is vertically adjustable relative to said work rest.

* * * * *